US008281298B2

(12) United States Patent
Bielski

(10) Patent No.: US 8,281,298 B2
(45) Date of Patent: Oct. 2, 2012

(54) EVALUATING COMPUTER DRIVER UPDATE COMPLIANCE

(75) Inventor: Julianne Bielski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1432 days.

(21) Appl. No.: 11/845,486

(22) Filed: Aug. 27, 2007

(65) Prior Publication Data

US 2009/0064122 A1    Mar. 5, 2009

(51) Int. Cl.
G06F 9/44      (2006.01)
G06F 9/445     (2006.01)

(52) U.S. Cl. .......................... 717/168; 717/174; 717/175

(58) Field of Classification Search ........................ None
See application file for complete search history.

(56) References Cited

U.S. PATENT DOCUMENTS

| | | | |
|---|---|---|---|
| 6,185,678 B1 | 2/2001 | Arbaugh et al. | |
| 6,574,657 B1 | 6/2003 | Dickinson | |
| 6,892,304 B1 | 5/2005 | Galasso et al. | |
| 7,574,706 B2 * | 8/2009 | Meulemans et al. | 717/174 |
| 7,624,391 B2 * | 11/2009 | Boldon et al. | 717/169 |
| 8,074,217 B2 * | 12/2011 | James et al. | 717/175 |
| 2003/0182652 A1 * | 9/2003 | Custodio | 717/122 |
| 2005/0132359 A1 * | 6/2005 | McGuire et al. | 717/175 |
| 2006/0150176 A1 * | 7/2006 | Dorricott et al. | 717/168 |
| 2007/0016888 A1 * | 1/2007 | Webb | 717/106 |
| 2007/0050761 A1 * | 3/2007 | Hester et al. | 717/168 |
| 2007/0220511 A1 * | 9/2007 | Clarke et al. | 717/174 |
| 2008/0244554 A1 * | 10/2008 | Kadashevich | 717/168 |

FOREIGN PATENT DOCUMENTS

WO    WO 2004/015516 A2    2/2004

OTHER PUBLICATIONS

Chandra et al, The collective: A Cache-based Syatem Management Architecture,Proceedings of the 2nd conference on Symposium on Networked Systems Design & Implementation, 2005, Retrieved on [May 17, 2012], Retrieved from the Internet: URL<http://delivery.acm.org/10.1145/1260000/1251222/p19-chandra.pdf>.*

(Continued)

*Primary Examiner* — Thuy Dao
*Assistant Examiner* — Cheneca Smith
(74) *Attorney, Agent, or Firm* — H. Barrett Spraggins; Cynthia G. Seal; Biggers & Ohanian, LLP

(57) ABSTRACT

Evaluating computer driver update compliance including applying a hashing algorithm to the contents of a driver repository, yielding a first hash value, the driver repository containing installed drivers for a computer; dating the first hash value; storing the first hash value and the date of the first hash value; identifying a candidate update for a driver installed in the repository, the candidate update having an update date; again applying the hashing algorithm to the contents of the driver repository, yielding a second hash value; comparing the first hash value and the second hash value; if the first hash value and the second hash value match, comparing the date of the first hash value and the update date; and if the update date is later than the date of the first hash value, reporting that the candidate update has not yet been installed.

18 Claims, 4 Drawing Sheets

OTHER PUBLICATIONS

Reid et al, DRM, trusted computing and operating system architecture, Proceedings of the 2005 Australasian workshop on Grid computing and e-research—vol. 44, 2005, Retrieved on [May 17, 2012] Retrieved from the Internet: URL<http://dl.acm.org/citation.cfm?id=1082308>.*

Padioleau, et al.; Understanding Collateral Evolution in Linux Device Drivers; Apr. 2006; pp. 70-82; Leuven, Belgium.

Sarmenta, et al.; Virtual Monotonic Counters and Count-Limited Objects using a TPM without a Trusted OS; Nov. 2006; pp. 27-41; Alexandria, Virginia, USA.

Sadeghi, et al.; TCG Inside?—A Note on TPM Specification Compliance; Nov. 2006; pp. 58-67; Alexandria, Virginia, USA.

Spear, et al.; Solving the Starting Problem: Device Drivers as Self-Describing Artifacts; Apr. 2006; pp. 56-68; Leuven, Belgium.

* cited by examiner

EVALUATING COMPUTER DRIVER UPDATE COMPLIANCE

BACKGROUND OF THE INVENTION

1. Field of the Invention

The field of the invention is data processing, or, more specifically, methods, apparatus, and products for evaluating computer driver update compliance.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computers typically employ drivers for specific hardware devices to allow computer programs to interact with those specific hardware devices. Often such device drivers lack version information making it difficult to determine whether a currently installed driver is the most recent version of that driver available. There is therefore an ongoing need in evaluating currently installed computer drivers.

SUMMARY OF THE INVENTION

Methods, systems, and computer program products are provided for evaluating computer driver update compliance. Embodiments typically include applying a hashing algorithm to the contents of a driver repository, yielding a first hash value, the driver repository containing installed drivers for a computer; dating the first hash value; storing the first hash value and the date of the first hash value; identifying a candidate update for a driver installed in the repository, the candidate update having an update date; again applying the hashing algorithm to the contents of the driver repository, yielding a second hash value and comparing the first hash value and the second hash value. If the first hash value and the second hash value do not match, embodiments may include reporting that the contents of the driver repository have been altered since the date of the first hash value. If the first hash value and the second hash value match, embodiments include comparing the date of the first hash value and the update date and if the update date is later than the date of the first hash value, reporting that the candidate update has not yet been installed. If the update date is not later than the date of the first hash value, embodiments may include reporting that the candidate update is already installed.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
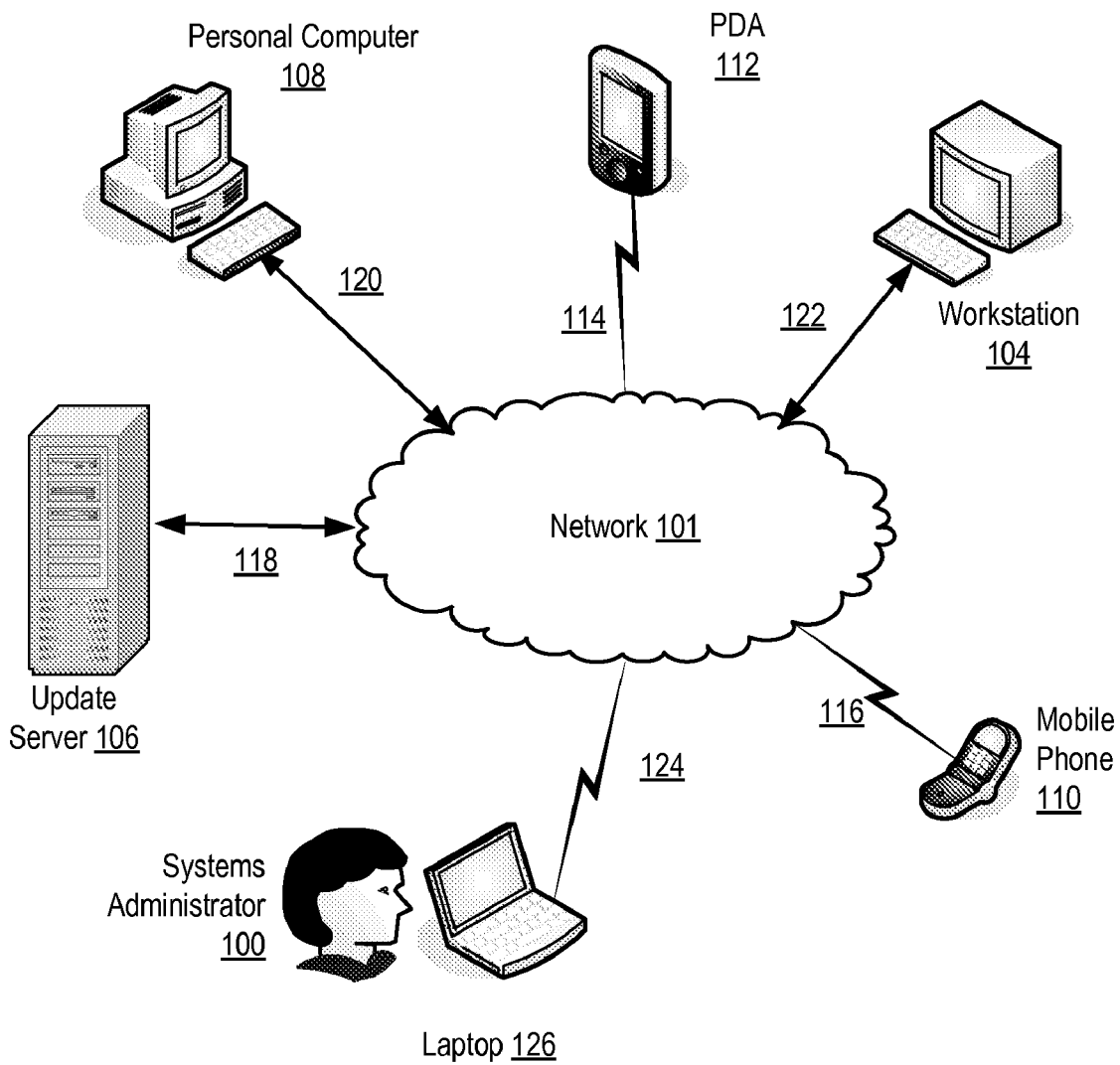
FIG. 1 sets forth a network diagram of a system for evaluating computer driver update compliance according to embodiments of the present invention.

Exemplary methods, apparatus, and products for evaluating computer driver update compliance in accordance with the present invention are described with reference to the accompanying drawings, beginning with FIG. 1. FIG. 1 sets forth a network diagram of a system for evaluating computer driver update compliance according to embodiments of the present invention. A driver is a computer program that allows higher-level computer programs to interact with a computer hardware device. A driver typically communicates with the device through a bus or communications subsystem to which the hardware is connected.

An update for a driver is a new release of an existing driver software product. Such updates often add relatively minor new features to the driver or address issues found after the driver was released. Computer driver update compliance is an indication that a currently installed update is the newest release of the driver. That is, if a currently installed update is the newest release of the driver the driver is considered in compliance and if a currently installed update is not the newest release of the driver the driver is considered out of compliance.

The system of FIG. 1 includes a number of computers (106, 108, 112, 104, 110, and 126) connected to a network (101). The network (101) may be implemented as a local area network ('LAN'), a wide area network ('WAN') or any other network configuration as will occur to those of skill in the art.

The system of FIG. 1 includes an update server (106) connected to the network (101) through a wireline connection (118). The update server (106) of FIG. 1 provides for download driver updates. Such a driver update may be downloaded to computers (106, 108, 112, 104, 110, and 126) through the network (101).

The system of FIG. 1 includes a number of computers (108, 112, 104, 110, and 126) capable of evaluating computer driver update compliance according to embodiments of the present invention. The system of FIG. 1 includes a personal computer (108) connected to the network (101) through a wireline connection (120). The system of FIG. 1 also includes a personal digital assistant ('PDA') (112) connected to the network (101) through a wireless connection (114) and a workstation (104) connected to the network (101) through a wireline connection (122). The system of FIG. 1 includes a mobile phone (110) connected to the network (101) through a wireless connection (118). The system of FIG. 1 also includes a laptop computer (126) connected to the network (101) through a wireless connection (126).

Each of the computers (108, 112, 104, 110, and 126) of FIG. 1 have installed upon them one or more drivers and each are capable of evaluating computer driver update compliance in accordance with the present invention by applying a hashing algorithm to the contents of a driver repository, yielding a first hash value, the driver repository containing installed drivers for a computer; dating the first hash value; storing the first hash value and the date of the first hash value; identifying a candidate update for a driver installed in the repository, the candidate update having an update date; again applying the hashing algorithm to the contents of the driver repository, yielding a second hash value and comparing the first hash value and the second hash value. If the first hash value and the second hash value do not match, each of the computers (108, 112, 104, 110, and 126) of FIG. 1 are capable of reporting for a systems administrator (100) that the contents of the driver repository have been altered since the date of the first hash value. If the first hash value and the second hash value match, each of the computers (108, 112, 104, 110, and 126) of FIG. 1 are capable of comparing the date of the first hash value and the update date and if the update date is later than the date of the first hash value, reporting to the systems administrator (100) that the candidate update has not yet been installed. If the update date is not later than the date of the first hash value, each of the computers (108, 112, 104, 110, and 126) of FIG. 1 are capable of reporting to the systems administrator (100) that the candidate update is already installed.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Evaluating computer driver update compliance in accordance with the present invention is generally implemented with computers, that is, with automated computing machinery. For further explanation, therefore, FIG. 2 sets forth a block diagram of automated computing machinery comprising an exemplary computer (152) useful in evaluating computer driver update compliance according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a driver update module (400), a module of computer program instructions for evaluating computer driver update compliance according to embodiments of the present invention. The driver update module (400) of FIG. 2 includes computer program instructions capable of applying a hashing algorithm to the contents of a driver repository, yielding a first hash value, the driver repository containing installed drivers for a computer; dating the first hash value; storing the first hash value and the date of the first hash value; identifying a candidate update for a driver installed in the repository, the candidate update having an update date; again applying the hashing algorithm to the contents of the driver repository, yielding a second hash value and comparing the first hash value and the second hash value. The driver update module (400) also includes computer program instructions capable of reporting that the contents of the driver repository have been altered since the date of the first hash value if the first hash value and the second hash value do not match. The driver update module (400) also includes computer program instructions capable of comparing the date of the first hash value and the update date if the first hash value and the second hash value match, and if the update date is later than the date of the first hash value, reporting that the candidate update has not yet been installed. The driver update module (400) also includes computer program instructions capable of reporting that the candidate update is already installed if the update date is not later than the date of the first hash value.

Also stored in RAM (168) is an operating system (154). Operating systems useful evaluating computer driver update compliance according to embodiments of the present invention include UNIX™, Linux™, Microsoft XP™, AIX™, IBM's i5/OS™, and others as will occur to those of skill in the art. The operating system (154) and driver update module (400) in the example of FIG. 2 are shown in RAM (168), but many components of such software typically are stored in non-volatile memory also, such as, for example, on a disk drive (170).

Figure 2:
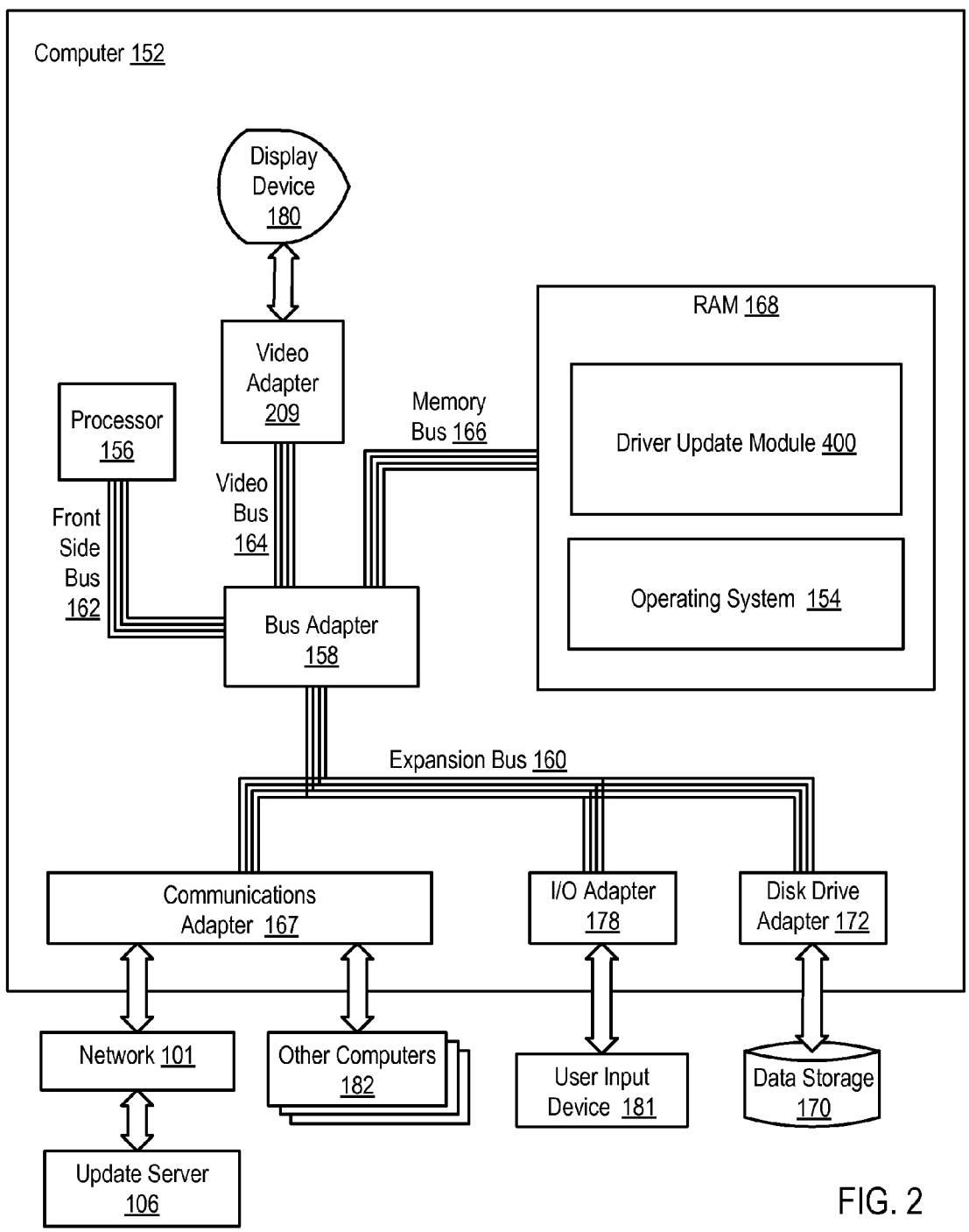
FIG. 2 sets forth a block diagram of automated computing machinery comprising an exemplary computer (152) useful in evaluating computer driver update compliance according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for evaluating computer driver update compliance according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art. The data storage (170) of FIG. 2 includes installed drivers whose compliance may be evaluated according to the present invention.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for evaluating computer driver update compliance according to embodiments of the present invention include modems for wired dial-up communications, Ethernet (IEEE 802.3) adapters for wired data communications network communications, and 802.11 adapters for wireless data communications network communications.

Figure 3:
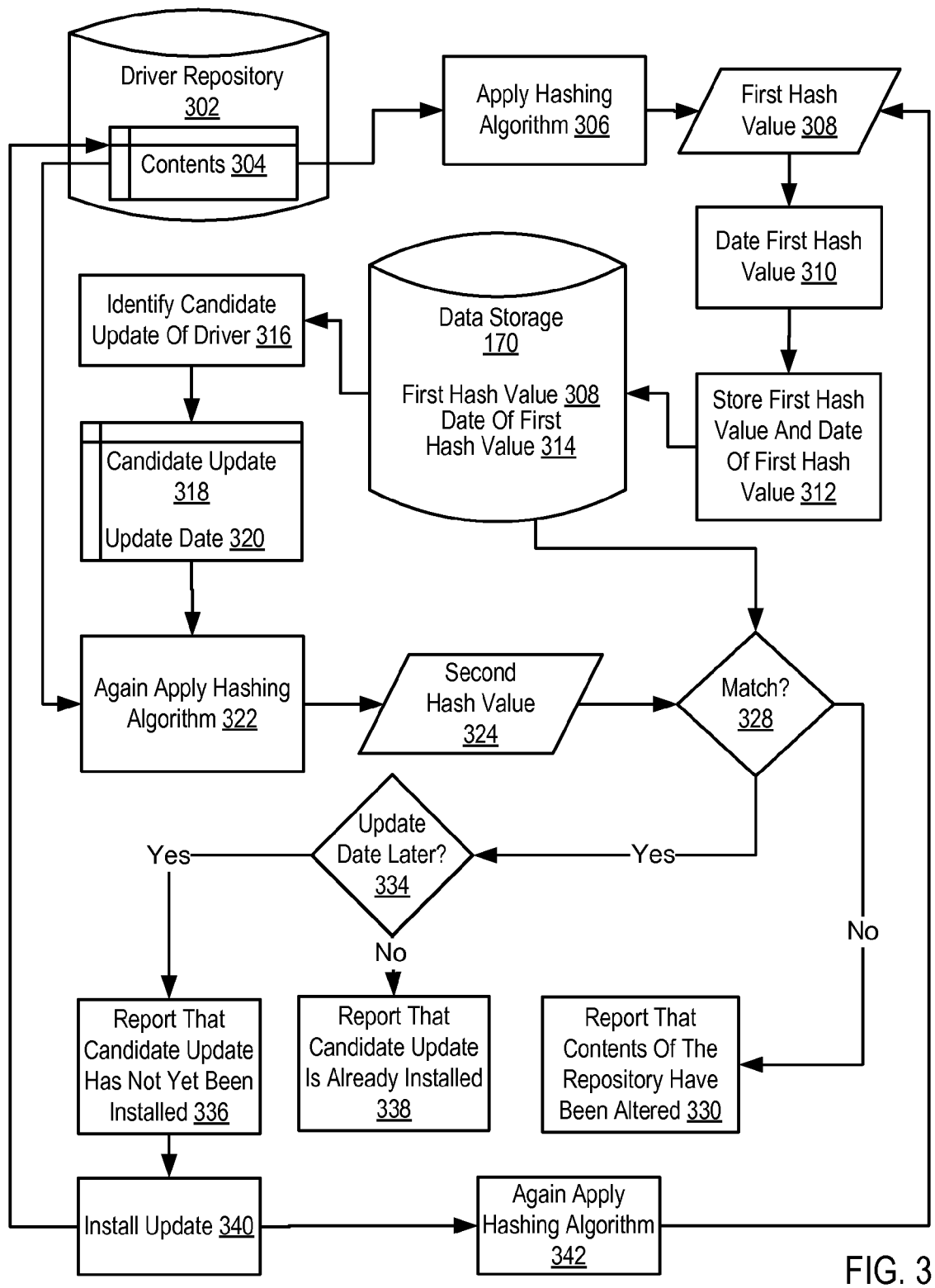
FIG. 3 sets forth a flow chart illustrating an exemplary method for evaluating computer driver update compliance according to embodiments of the present invention.

For further explanation, FIG. 3 sets forth a flow chart illustrating an exemplary method for evaluating computer driver update compliance according to embodiments of the present invention. The method of FIG. 3 includes applying (306) a hashing algorithm to the contents (304) of a driver repository (302), yielding a first hash value (308), the driver repository (302) containing installed drivers for a computer. A hash algorithm is a reproducible method of turning some kind of data into a single value, often a relatively small number that may serve as a digital representation of the data. The hashing algorithm typically substitutes or transposes the data to create such a digital representation. The output of a hashing algorithm is a hash value. Applying (306) a hashing algorithm to the contents (304) of a driver repository (302) provides a representational snapshot of the contents of the driver repository.

Often system administrators have available programs which use digital signatures to sign data. A digital signature is an electronic signature that is often used to authenticate the identity of the sender of a message or the signer of a document, and possibly to ensure that the original content of the message or document that has been sent is unchanged. Digital signatures typically include applying a hashing algorithm and encrypting the hash value produced by the hashing algorithm. Applying a hashing algorithm to the contents of a driver repository according to the method of FIG. 3 may therefore be carried out by digitally signing the contents of a driver repository, yielding a first digital signature. Examples of programs available for digitally signing data include digital signing software available from Infomosiac, eTimeStamp, and others as will occur to those of skill in the art.

The method of FIG. 3 also includes dating (310) the first hash value (308). Dating (310) the first hash value (308) is typically carried out by assigning the date that the hashing algorithm is applied to the contents of the driver repository to the first hash value. By assigning the date that the hashing algorithm is applied to the contents of the driver repository to the first hash value, the first hash value represents the contents of the driver repository on the date the hashing algorithm is applied.

The method of FIG. 3 also includes storing (312) the first hash value (308) and the date (314) of the first hash value (308). Storing (312) the first hash value (308) and the date (314) of the first hash value (308) is typically carried out by storing the first hash value and the date of the first hash value in data storage available to an update module capable of evaluating computer driver update compliance according to embodiments of the present invention.

The method of FIG. 3 also includes identifying (316) a candidate update (318) for a driver installed in the repository (302). A candidate update is an update to a currently installed driver in the driver repository. Identifying (316) a candidate update (318) for a driver installed in the repository (302) may be carried out by periodically monitoring known sources of driver updates such as known network addresses or websites of update servers and discovering that an update to an installed driver is available. The candidate update (318) also has an update date (320). An update date (320) is a date used to determine when the candidate update was made available for installation. An update date is typically implemented as the release date of the candidate update.

The method of FIG. 3 also includes again applying (322) the hashing algorithm to the contents (304) of the driver repository (302), yielding a second hash value (324). Again applying (322) the hashing algorithm to the contents (304) of the driver repository (302) is carried out by applying the hashing algorithm used to yield the first hash value to the contents of the driver repository. Again applying (322) the hashing algorithm to the contents (304) of the driver repository (302) yields a second hash value (324) which represents the contents of the driver repository after identifying the candidate update.

The method of FIG. 3 also includes comparing (328) the first hash value (308) and the second hash value (324). If the first hash value (308) and the second hash value (324) do not match, the contents of the driver repository have been altered since the date of the first hash value and therefore it cannot be determined conclusively whether the candidate update has been installed. The candidate update may already be installed, an update to another driver may have been installed, or the contents of the driver may have been altered in another way.

If the first hash value (308) and the second hash value (324) do not match, the method of FIG. 3 therefore includes reporting (330) that the contents (304) of the driver repository (302) have been altered since the date (314) of the first hash value. Reporting (330) that the contents (304) of the driver repository (302) have been altered since the date (314) of the first hash value may be carried out by notifying a systems administrator that the contents (304) of the driver repository (302) have been altered since the date (314) of the first hash value. A systems administrator may be notified to report that the contents of the repository have been altered through an automated notification such as an automated email, instant message, pop-up notification any other method of notification that will occur to those of skill in the art.

If the first hash value (308) and the second hash value (324) match, the contents of the driver repository have not changed since the date of the first hash value. If the candidate update was not yet available on the date of the first hash value, it can be conclusively determined that the candidate update has not been installed. In the method of FIG. 3, therefore, if the first hash value (308) and the second hash value (324) match, the method continues by comparing (334) the date (314) of the first hash value (308) and the update date (320). If the update date (320) is later than the date (314) of the first hash value, the method of FIG. 3 includes reporting (336) that the candidate update (318) has not yet been installed. Reporting (336) that the candidate update (318) has not yet been installed may be carried out by notifying a systems administrator that the candidate update has not yet been installed. A systems administrator may be notified to report that the candidate update has not yet been installed through an automated notification such as an automated email, instant message, pop-up notification any other method of notification that will occur to those of skill in the art.

If the update date (320) is later than the date (314) of the first hash value, the method of FIG. 3 also includes installing (340) the candidate update (318) in the driver repository (302); again applying (342) the hashing algorithm to the contents (304) of the driver repository (302), again yielding a first hash value (308); again dating (310) the first hash value (308); and again storing (312) the first hash value (308) and the date (314) of the first hash value (308).

If the first hash value (308) and the second hash value (324) match, the candidate update may already be installed if the date of the first hash value is after the update was made available. The likelihood that the candidate update is already installed if the date of the first hash value is after update date of the candidate update increases if the method of FIG. 3 is run frequently to identify that candidate updates are not currently installed and if such identified uninstalled candidate updates are installed soon after identification.

In the method of FIG. 3, therefore, if the first hash value (308) and the second hash value (324) match and if the update date (320) is not later than the date (314) of the first hash value, the method of FIG. 3 includes reporting (338) that the candidate update (318) is already installed. Reporting (338) that the candidate update (318) is already installed may be carried out by notifying a systems administrator that the candidate update is already installed. A systems administrator may be notified to report that the candidate update is already installed through an automated notification such as an automated email, instant message, pop-up notification any other method of notification that will occur to those of skill in the art.

Figure 4:
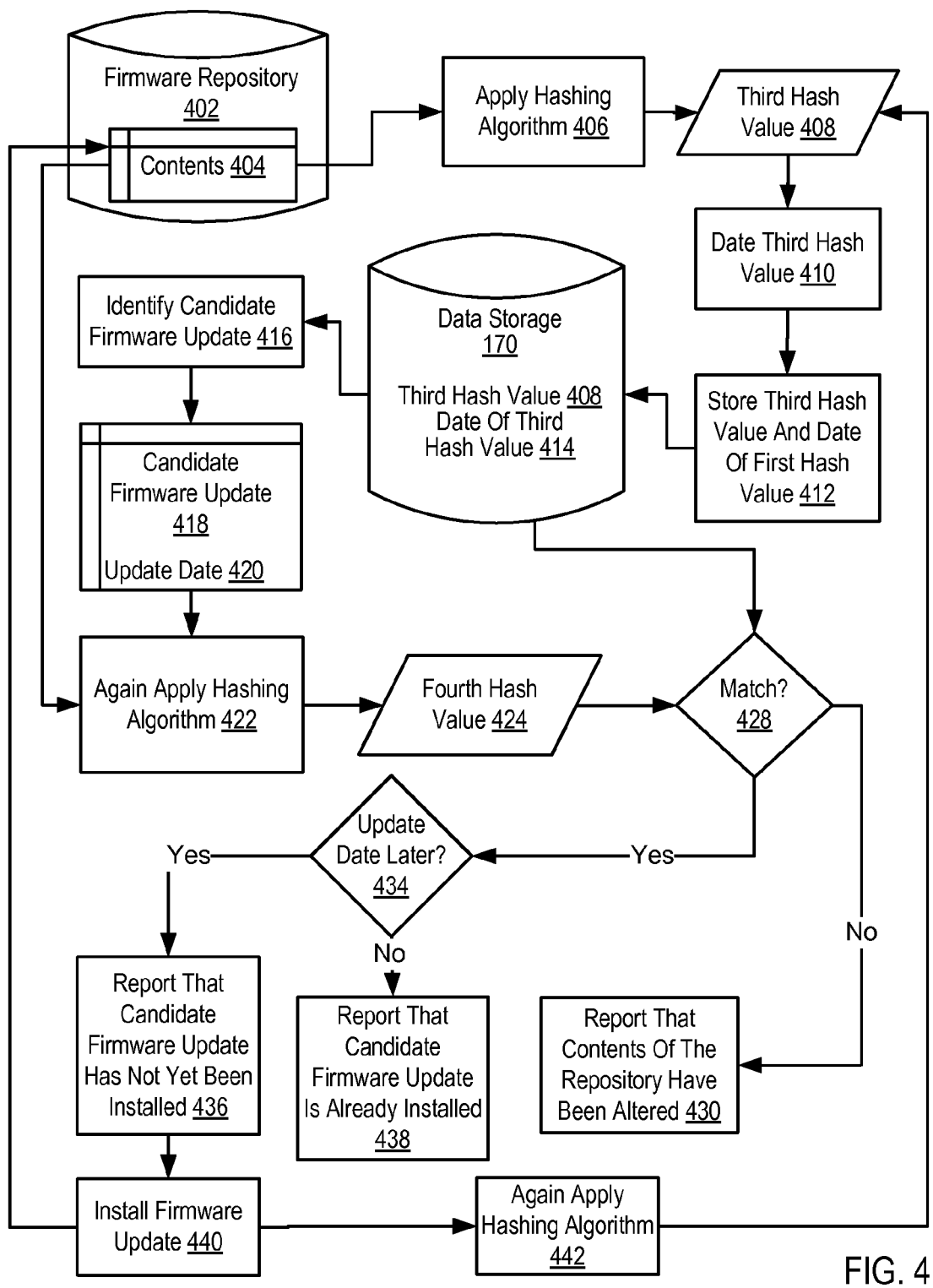
FIG. 4 sets forth a flow chart of additional steps in evaluating computer driver update compliance according to embodiments of the present invention that also includes evaluating compliance of read only memory ('ROM') firmware.

Evaluating computer driver update compliance according to embodiments of the present invention may also include evaluating compliance of read only memory ('ROM') firmware. For further explanation, FIG. 4 sets forth a flow chart of additional steps in evaluating computer driver update compliance according to embodiments of the present invention that also includes evaluating compliance of read only memory ('ROM') firmware. The method of FIG. 4 includes applying (406) the hashing algorithm to the contents (404) of a firmware repository (402), yielding a third hash value (408). In the example of FIG. 4 the firmware repository (402) contains firmware for a device.

The method of FIG. 4 includes dating (410) the third hash value (408) and storing (412) the third hash value (408) and the date (410) of the third hash value. Dating the third hash value is typically carried out by assigning the date that the hashing algorithm is applied to the contents of the firmware repository to the third hash value. Storing the third hash value and the date of the third hash value is typically carried out by storing the third hash value and the date of the third hash value in data storage available to an update module capable of evaluating computer driver update compliance according to embodiments of the present invention.

The method of FIG. 4 also includes identifying (416) a candidate firmware update (418) for firmware installed in the repository (402). A candidate firmware update is an update to currently installed firmware in the firmware repository. Identifying a candidate firmware update for a device may be carried out by periodically monitoring known sources of firmware updates such as known network addresses or websites of update servers and discovering that an update to a firmware in the firmware repository is available. The candidate firmware update (412) has a firmware update date (420). A firmware update date is a date used to determine when the candidate firmware update was made available for installation. A firmware update date is typically implemented as the release date of the candidate firmware update.

The method of FIG. 4 also includes again applying (422) the hashing algorithm to the contents (404) of the firmware repository (402), yielding a fourth hash value (424) and comparing (428) the third hash value (408) and the fourth hash value (424).). If the third hash value (408) and the fourth hash value (424) do not match, the contents of the firmware repository have been altered since the date of the third hash value and therefore it cannot be determined conclusively whether the candidate firmware update has been installed.

If the third hash value (408) and the fourth hash value (424) do not match, the method of FIG. 4 therefore includes reporting (430) that the contents (404) of the firmware repository (402) have been altered since the date (414) of the third hash value. Reporting (430) that the contents (404) of the firmware repository (402) have been altered since the date (414) of the third hash value may be carried out by notifying a systems administrator that the contents (404) of the firmware repository (402) have been altered since the date (414) of the third hash value. A systems administrator may be notified through an automated notification such as an automated email, instant message, pop-up notification any other method of notification that will occur to those of skill in the art If the third hash value (408) and the fourth hash value (424) match, the contents of the firmware repository have not changed since the date of the third hash value. If the candidate firmware update was not yet available on the date of the third hash value it can be conclusively determined that the candidate firmware update has not been installed. In the method of FIG. 4, therefore, if the third hash value (408) and the fourth hash value (424) match, the method continues by comparing (444) the date (414) of the third hash value (408) and the firmware update date (420). If the firmware update date (420) is later than the date (414) of the third hash value, the method of FIG. 4 includes reporting (436) that the candidate firmware update (418) has not yet been installed. Reporting (436) that the candidate firmware update (418) has not yet been installed may be carried out by notifying a systems administrator that the candidate update has not yet been installed. A systems administrator may be notified through an automated notification such as an automated email, instant message, pop-up notification any other method of notification that will occur to those of skill in the art.

If the firmware update date (420) is later than the date (414) of the third hash value, the method of FIG. 4 also includes installing (440) the candidate firmware update (418) in the firmware repository (402); again applying (442) the hashing algorithm to the contents (404) of the firmware repository (402), again yielding a third hash value (408); again dating (410) the third hash value (408); and again storing (412) the third hash value (408) and the date (414) of the third hash value (408).

If the third hash value (408) and the fourth hash value (424) match, the candidate firmware update may already be installed if the date of the third hash value is after the update was made available. The likelihood that the candidate firmware update is already installed if the date of the third hash value is after firmware update date of the candidate firmware update increases if the method of FIG. 4 is run frequently to identify that candidate firmware updates are not currently installed and if such identified uninstalled candidate firmware updates are installed soon after identification.

In the method of FIG. 4, therefore, if the third hash value (408) and the fourth hash value (424) match and if the update date (420) is not later than the date (414) of the third hash value, the method of FIG. 4 includes reporting (438) that the candidate firmware update (418) is already installed. Reporting (438) that the candidate firmware update (418) is already installed may be carried out by notifying a systems administrator that the candidate firmware update is already installed. A systems administrator may be notified through an automated notification such as an automated email, instant message, pop-up notification any other method of notification that will occur to those of skill in the art.

Exemplary embodiments of the present invention are described largely in the context of a fully functional computer system for evaluating computer driver update compliance. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method executed by a processor for evaluating computer driver update compliance, the method comprising:
    applying a hashing algorithm to the contents of a driver repository, yielding a first hash value, the driver repository containing installed drivers for a computer;
    dating the first hash value; storing the first hash value and the date of the first hash value;
    identifying a candidate update for a driver installed in the repository, the candidate update having an update date;
    again applying the hashing algorithm to the contents of the driver repository, yielding a second hash value;
    comparing the first hash value and the second hash value;
    if the first hash value and the second hash value match, comparing the date of the first hash value and the update date; and
    if the update date is later than the date of the first hash value, reporting that the candidate update has not yet been installed.

2. The method of claim 1 further comprising:
    if the update date is not later than the date of the first hash value, reporting that the candidate update is already installed.

3. The method of claim 1 further comprising:
    if the first hash value and the second hash value do not match, reporting that the contents of the driver repository have been altered since the date of the first hash value.

4. The method of claim 1 further comprising:
    installing the candidate update in the driver repository;
    again applying the hashing algorithm to the contents of the driver repository, again yielding a first hash value;
    again dating the first hash value; and again storing the first hash value and the date of the first hash value.

5. The method of claim 1 wherein applying a hashing algorithm to the contents of a driver repository, yielding a first hash value further comprises digitally signing the contents of a driver repository, yielding a first digital signature.

6. The method of claim 1 further comprising applying the hashing algorithm to the contents of a firmware repository, yielding a third hash value, the firmware repository containing firmware for a device;
    dating the third hash value;
    storing the third hash value and the date of the third hash value;
    identifying a candidate firmware update for firmware installed in the repository, the candidate firmware update having a firmware update date;
    again applying the hashing algorithm to the contents of the firmware repository, yielding a fourth hash value; comparing the third hash value and the fourth hash value;
    if the third hash value and the fourth hash value match, comparing the date of the third hash value and the firmware update date; and
    if the firmware update date is later than the date of the third hash value, reporting that the candidate firmware update has not yet been installed.

7. A system for evaluating computer driver update compliance, the system comprising a computer processor, a computer memory operatively coupled to the computer processor, the computer memory having disposed within it computer program instructions capable of:
    applying a hashing algorithm to the contents of a driver repository, yielding a first hash value, the driver repository containing installed drivers for a computer;
    dating the first hash value;
    storing the first hash value and the date of the first hash value;
    identifying a candidate update for a driver installed in the repository, the candidate update having an update date;
    again applying the hashing algorithm to the contents of the driver repository, yielding a second hash value;
    comparing the first hash value and the second hash value; if the first hash value and the second hash value match, comparing the date of the first hash value and the update date; and
    if the update date is later than the date of the first hash value, reporting that the candidate update has not yet been installed.

8. The system of claim 7 wherein the computer memory also has disposed within it computer program instructions capable of:
    reporting that the candidate update is already installed if the update date is not later than the date of the first hash value.

9. The system of claim 7 wherein the computer memory also has disposed within it computer program instructions capable of:
    reporting that the contents of the driver repository have been altered since the date of the first hash value if the first hash value and the second hash value do not match.

10. The system of claim 7 wherein the computer memory also has disposed within it computer program instructions capable of:
    installing the candidate update in the driver repository;
    again applying the hashing algorithm to the contents of the driver repository,
    again yielding a first hash value; again dating the first hash value; and
    again storing the first hash value and the date of the first hash value.

11. The system of claim 7 wherein computer program instructions capable of applying a hashing algorithm to the contents of a driver repository, yielding a first hash value further comprise computer program instructions capable of digitally signing the contents of a driver repository, yielding a first digital signature.

12. The system of claim 7 wherein the computer memory also has disposed within it computer program instructions capable of:
applying the hashing algorithm to the contents of a firmware repository, yielding a third hash value, the firmware repository containing firmware for a device;
dating the third hash value;
storing the third hash value and the date of the third hash value;
identifying a candidate firmware update for firmware installed in the repository, the candidate firmware update having a firmware update date;
again applying the hashing algorithm to the contents of the firmware repository, yielding a fourth hash value;
comparing the third hash value and the fourth hash value;
if the third hash value and the fourth hash value match, comparing the date of the third hash value and the firmware update date; and
if the firmware update date is later than the date of the third hash value, reporting that the candidate firmware update has not yet been installed.

13. A computer program product for evaluating computer driver update compliance, the computer program product disposed in a computer readable, recordable storage medium, the computer program product comprising computer program instructions capable of:
applying a hashing algorithm to the contents of a driver repository, yielding a first hash value, the driver repository containing installed drivers for a computer;
dating the first hash value;
storing the first hash value and the date of the first hash value;
identifying a candidate update for a driver installed in the repository, the candidate update having an update date;
again applying the hashing algorithm to the contents of the driver repository, yielding a second hash value;
comparing the first hash value and the second hash value;
if the first hash value and the second hash value match, comparing the date of the first hash value and the update date; and
if the update date is later than the date of the first hash value, reporting that the candidate update has not yet been installed.

14. The computer program product of claim 13 further comprising computer program instructions capable of reporting that the candidate update is already installed if the update date is not later than the date of the first hash value.

15. The computer program product of claim 13 further comprising computer program instructions capable of reporting that the contents of the driver repository have been altered since the date of the first hash value if the first hash value and the second hash value do not match.

16. The computer program product of claim 13 further comprising computer program instructions capable of:
installing the candidate update in the driver repository;
again applying the hashing algorithm to the contents of the driver repository, again yielding a first hash value;
again dating the first hash value; and
again storing the first hash value and the date of the first hash value.

17. The computer program product of claim 13 wherein computer program instructions capable of applying a hashing algorithm to the contents of a driver repository, yielding a first hash value further comprise computer program instructions capable of digitally signing the contents of a driver repository, yielding a first digital signature.

18. The computer program product of claim 13 further comprising computer program instructions capable of:
applying the hashing algorithm to the contents of a firmware repository, yielding a third hash value, the firmware repository containing firmware for a device;
dating the third hash value;
storing the third hash value and the date of the third hash value;
identifying a candidate firmware update for firmware installed in the repository, the candidate firmware update having a firmware update date;
again applying the hashing algorithm to the contents of the firmware repository, yielding a fourth hash value;
comparing the third hash value and the fourth hash value;
if the third hash value and the fourth hash value match, comparing the date of the third hash value and the firmware update date; and
if the firmware update date is later than the date of the third hash value, reporting that the candidate firmware update has not yet been installed.

* * * * *